United States Patent
Kurata

[11] 4,046,234
[45] Sept. 6, 1977

[54] DEVICE FOR GUIDING A CALIPER IN A DISK BRAKE

[75] Inventor: Masayuki Kurata, Saitama, Japan

[73] Assignee: Akebono Brake Industry Co., Ltd., Tokyo, Japan

[21] Appl. No.: 629,537

[22] Filed: Nov. 6, 1975

[51] Int. Cl.² ............................................. F16D 65/32
[52] U.S. Cl. ................................................. 188/73.3
[58] Field of Search .................... 188/73.3, 73.5, 72.4, 188/72.5, 73.4, 73.6, 205, 206

[56] References Cited

U.S. PATENT DOCUMENTS

| 3,265,160 | 8/1966 | Elberg et al. | 188/73.6 |
| 3,403,756 | 10/1968 | Thirion | 188/73.3 |
| 3,612,226 | 10/1971 | Pauwels | 188/73.6 X |
| 3,734,243 | 5/1973 | Girauldon | 188/73.3 X |

FOREIGN PATENT DOCUMENTS

| 445,906 | 1/1965 | Japan | 188/73.3 |
| 1,384,503 | 2/1975 | United Kingdom | 188/73.3 |

*Primary Examiner*—Trygve M. Blix
*Assistant Examiner*—Douglas C. Butler
*Attorney, Agent, or Firm*—Stevens, Davis, Miller & Mosher

[57] ABSTRACT

A device for guiding a caliper in a disk brake including a portion of the disk brake which is fixed, a caliper body and a sliding sheet having a high degree of resistance to corrosion which is fixedly placed on a sliding surface between the fixed portion of the disk brake and the caliper body to thereby avoid entry of dusts, muddy water, and salt containing snow into the sliding portion, thus maintaining a proper braking performance. The sliding sheet may be made of stainless steel.

1 Claim, 3 Drawing Figures a caliper guiding device in accordance with the present invention;

DEVICE FOR GUIDING A CALIPER IN A DISK BRAKE

BACKGROUND OF THE INVENTION

This invention is directed to the field of caliper guiding devices in a disk brake and principally to an improved device for guiding a caliper of the type in which an inverted U type fixed member, which extends over an outer periphery of a brake disk and is provided with wall plates disposed parallel to a front surface and a rear surface of said brake disk, guides and supports a friction pad on a bottom within a concavity formed by cutting out a middle portion along the upper edge of said fixed member, and a caliper body for exerting a hydraulic braking force upon said friction pad is laterally slidably guided within an upper space of said concavity. More essentially, the device according to the present invention provides an arrangement in which corrosion is prevented from gathering on a sliding surface between the fixed member and the caliper body to secure stable and smooth movement of the caliper body.

DESCRIPTION OF THE PRIOR ART

In prior art caliper guiding devices in disk brakes of this sort, zinc plating is applied to the sliding surface of the caliper body while nickel plating is applied to the guide surface of a guide member, and PBC grease is coated between both surfaces to provide smooth sliding.

In the above-mentioned conventional caliper guiding devices, however, when the grease is gone, the caliper body becomes encrusted with rust to increase sliding resistance or the sliding portion becomes frozen.

Such a tendency as described above is particularly common in areas such as North America where a freezing inhibitor (of which salt is the main constituent) is widely used in the winter season for snow removal from the roadways. The whole disk brake device releases absorbed energy caused by braking or weight through thermal radiation. The heat generated dissolves the snow which has accumulated on the brake device as a result of the running of the vehicle and permits the inhibitors contained therein to adhere to the caliper sliding surface to erode the surface.

SUMMARY OF THE INVENTION

The present invention overcomes the disadvantages noted above with respect to prior art devices by providing a sliding surface in which a sliding sheet having a high degree of resistance to corrosion, such as thin stainless steel or the like, is fixedly placed on a sliding surface between a fixed portion of the disk brake and a caliper body, particularly on a sliding part on the side of the caliper body generally made of a casting. It is therefore an object of this invention to provide a disk brake which can withstand corrosion and maintain a normal braking performance even if dust, muddy water, and the above-mentioned salt from snow should enter the sliding part.

Other objects and features of the invention will become apparent by reference to the following description and accompanying drawings, which disclose by way of example, the principal of the invention.

DESCRIPTION OF THE PREFERRED EMBODIMENT

Figure 1:
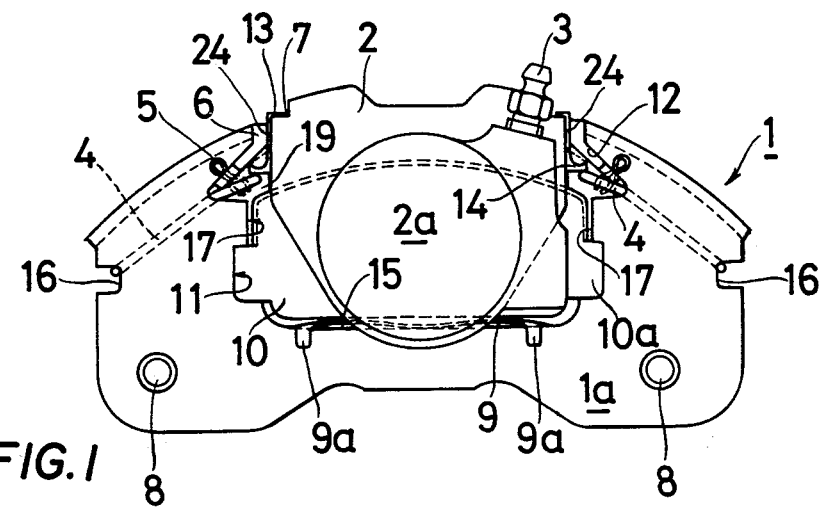
FIG. 1 is a front view of a disk brake provided with a caliper guiding device in accordance with the present invention.
Figure 2:
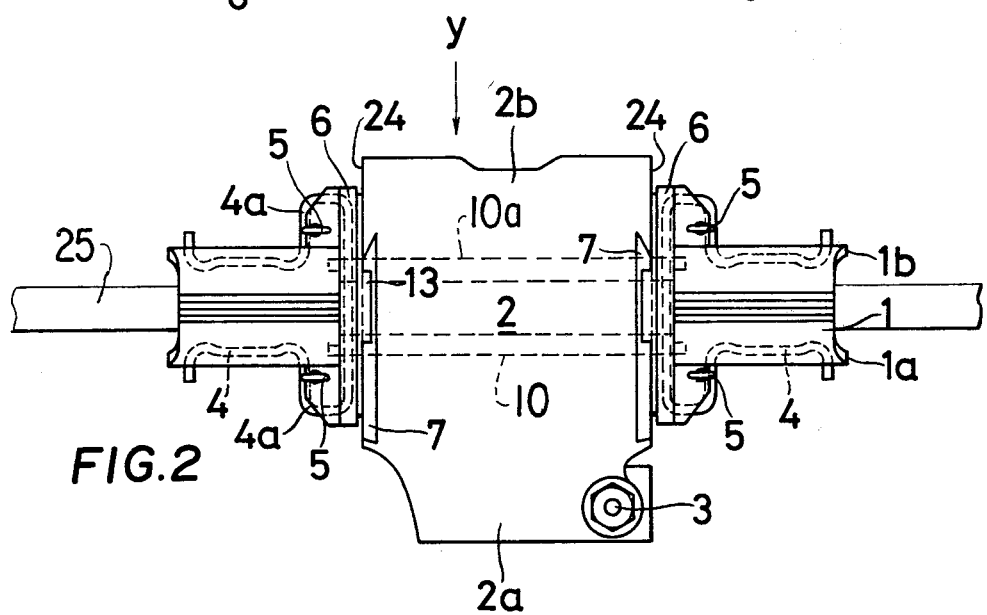
FIG. 2 is a plan view of the disk brake of FIG. 1.

Turning now to FIGS. 1 and 2, fixed member 1 of an inverted U type in longitudinal section extends over an upper outer peripheral portion of a brake disk 25 and is provided with a front wall plate 1a and a rear wall plate 1b disposed parallel to a front surface and a rear surface of said brake disk. Fixed member 1 is secured to a nonrotary portion of the vehicle by means of bolts inserted through bolt holes 8, 8 made in front wall plate 1a. Caliper body 2 comprises a front end formed with cylinder portion 2a, rear end 2b extended downwardly having a pawl adapted to directly push a rear friction pad 10a, and a middle portion supported within concavity 19 formed by cutting a middle portion along the upper edge of fixed member 1. A front friction pad as indicated at 10, correctly speaking, comprises a friction member in direct frictional engagement with the brake disk and a back plate for holding the friction member adhered thereto to form an integral form. The back plate has ledges 10a formed at both side edges thereof. Front friction pad 10 is brought into direct abutment with a piston (not shown) slidably received in cylinder portion 2a of the caliper body and is placed in frictional engagement with the front surface of the brake disk by pressure fluid introduced through liquid port 3.

To guide and support caliper body 2 and a pair of friction pads at front and rear sides, respectively, the concavities formed in both the front and rear wall plates 1a and 1b of the fixed member are contoured as follows: That is, the concavity 19 formed symmetrically to the left and right comprises side edges 17 and 17 vertically extended and a horizontal bottom edge 15 as shown in FIG. 1. Each of side edges 17 has a V type notch groove 12 formed in an upper portion thereof and a square notch 11 formed in a lower portion thereof. The aforesaid ledges of the friction pads have both side edges guided and supported by the notch 11, and the bottom edge is lightly supported by a flat spring 9 placed in a space adjacent the bottom edge 15 in the concavities. Flat spring 9 is supported on fixed member 1 in such a manner that wall plates 1a and 1b are held by downwardly bent tongues 9a formed in opposite ends of the flat spring.

In the caliper guiding device, pin-like projections 14, 14 of a V type section are formed on both side walls 24, 24 perpendicular to the caliper body extending almost the entire length in a lateral direction thereof, the pin-like projections 14, 14 being received in the V type notch grooves 12 to allow free slidable movement of the caliper body 2 in a lateral direction, and the caliper body is supported on the fixed member 1 without imposing the weight of the caliper body to the friction pad. With this arrangement guide members 6, for guiding downwardly an inclined plane, inclined toward the outside of the projections 14 will have their upper surfaces brought into abutment with the upper edge portions and vertical side edge portions of the notch grooves 12, and linear springs 4 for guiding and supporting horizontal lower surfaces of the projections 14 are retained in the deepest portions of the notch grooves 12 and notches 16 formed in end edges of the front and rear wall plates 1a and 1b. That is, the inclined surface and lower surface of the projections 14 are held by the guide member 6 and spring 4. The guide member 6 has opposite ends laterally extending from the fixed member 1 as shown in FIG. 2 to provide a sufficient sliding guide surface and is prevented from being moved in the lengthwise direction by pins 5, 5 mounted adjacent front and rear walls 1a, 1b. Spring 4 extends underneath and parallel to guide member 6, and has opposite ends bent to form a portion 4a, which is engaged in the deepest portion of notch groove 12. Spring 4 is then bent at right angles along the inner surfaces of wall plates 1a, 1b and bent at notch 16 toward the outer surfaces of wall plates 1a, 1b so that the spring may be retained. Thus, the weight of caliper body 2 may be resiliently supported by elastic force due to twisting deformation principally in the portion 4a to minimize frictional resistance of the sliding portion.

Figure 3:
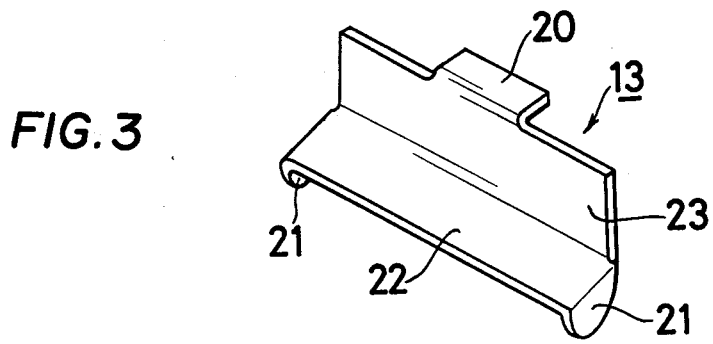
FIG. 3 is a perspective view showing a sliding plate, which constitutes one element of the caliper guiding device.

In order to minimize the frictional resistance as described, particularly the frictional resistance created by rust gathered on the inclined surface and vertical surface of projection 14, a sliding plate 13 as shown in FIG. 3 is attached to the projection. The sliding plate 13 is formed of, for example, a stainless steel plate, which is punched by a press and bent. The sliding plate comprises a horizontal shoulder 20 rested on a shoulder portion 7 shaved to be formed on the top end of the side wall 24 of the caliper body, a vertical sliding surface 23 placed in abutment with the side wall 24, and an inclined sliding surface 22 placed in abutment with the lower surface of the guide member 6. The sliding surface 22 has extended ends downwardly bent to hold the front and rear ends of the projection 14. In this case, adhesives are preferably coated on the surface placed in abutment with the projection to secure it firmly to the caliper body 2.

Nickel plating or the like may be applied to guide member 6 to avoid gathering rust.

In the device according to the present invention as constructed above, when pressure liquid is fed from liquid port 3 to cylinder portion 2a of caliper body 2 at the time of brake application, front friction pad 10 is directly urged by the piston in the cylinder portion against the front surface of the brake disk and at the same time caliper body 2 receives a reactive force from the cylinder portion and moves in the concavity in fixed member 1 in the direction as indicated by arrow (y) in FIG. 2, after which the rear friction pad 10a is urged by the rear end 2b against the rear surface of the brake disk to thereby generate a braking force.

In caliper body 2 in the state as described, sliding plate 13 is adapted to cover vertical side wall 24 and the inclined surface of projection 14 is guided and supported along guide member 6 while the lower surface of projection 14 slides on spring 4. It is obvious that the aforesaid sliding portions are coated with grease, and a portion exposed to surface pressure of the sliding portion, that is, the inclined sliding surface 22 of the sliding plate 13 has its whole surface covered by the guide member 6 to thereby prevent the flow-out of grease coated on said portion, thus maintaining lubrication thereof. In addition, dust, muddy water, snow containing salt, etc. entering from outside may be prevented from scattering and adhering. Even if sliding plate 13 should be entered, the top portion of projection 14 may be prevented from becoming rusted due to tongues 21 since the sliding portion the caliper body is substantially covered by the stainless steel sliding plate.

In order to assure anticorrosive effect attained by the caliper guiding device of the disk brake according to the present invention, a comparison test by way of a salt water spraying method under JIS (Japanese Industrial Standard) has been carried out between the present device and a disk brake similar thereto but not provided with a stainless steel sliding plate. The sliding resistance of the caliper guiding portion according to the present invention is less than one-half of the sliding resistance of those disk brakes not provided with a sliding plate.

According to the present invention, there is provided a caliper guiding device in a disk brake of the type in which a fixed member of an inverted U type in section, which extends over a parallel outer periphery of a brake disk and provided with wall plates disposed parallel to both front and rear surfaces of the brake disk, guides and supports a friction pad on a bottom within a concavity formed by cutting out a middle portion along the upper edge of the fixed member, and projections of a V type in section of a caliper body are guided and supported within V type notch grooves formed at upper portions of both side edges of the fixed member, the caliper guiding device consisting in lower surfaces of the projections being supported by means of springs retained on the fixed member, and a sliding plate having a high degree of corrosion resistance secured to the inclined surface of the projection. The sliding plate is retained in the notch groove and opposite ends thereof are slidably guided by a guide member extended laterally of the fixed member. From the aforementioned structure, anticorrosive effects in the sliding portion between the caliper body and the fixed member, that is, in the projections are materially enhanced, and the upper sides of the projections are covered by the guide member to avoid entry of dust, muddy water, snow including salt such as a freezing inhibitor, etc. thus maintaining a stable braking performance.

In the device of the present invention, only the sliding portion is covered with a metal plate having a high degree of corrosion resistance without giving particular consideration to the material of which the caliper body is formed. The device may be manufactured at low cost.

In the disk brakes of this sort, a braking torque exerted upon a friction pad is directly carried by a fixed member so that contact surface pressure in the sliding portion of the caliper body is merely caused by the reaction force of the spring 4 corresponding to the weight of the caliper body. The provision of a inclined surface of action as described will produce effects such that the caliper body may not only be wedged but also prevent satisfactorily entry of muddy water or the like from flying therein from both the upper and lower directions.

What is claimed is:
1. A disk brake comprising:
a rotatable brake disk having a front and a rear surface;
an inverted U type fixed member extending over an outer peripheral portion of said brake disk and having interconnected wall plates disposed parallel to said front and rear surfaces of said brake disk;
friction pads guided and supported on a bottom portion of a concavity formed on a middle portion along an upper edge of said fixed member, and concavity defining V-type notch grooves at upper portions of both side edges of said concavity;

a guide member retained in each of said notch grooves and having opposite ends, each of said ends laterally extending from said fixed member;

a caliper body having projections of a V-type in section and slidably supported within said V-type notch grooves, each of said projections defining an upper and a lower sliding surface;

a pair of associated springs retained by said fixed member to support said lower surface of each of said projections; and an anticorrosive sliding metal plate fixedly placed on each of said projections, said sliding metal plate having a horizontal shoulder positioned on a shoulder portion formed on a top end of a side wall of said caliper body, a vertical sliding surface placed in abutment with said side wall of said caliper body, an inclined sliding surface placed on said upper surface of each of said projections and being in abutment with a bottom surface of said guide member and a pair of tongues downwardly extended from the opposite edges of said inclined sliding surface to hold a front and a rear end of each of said projections of said caliper body.

* * * * *